United States Patent [19]

Van Name et al.

[11] Patent Number: 5,341,638
[45] Date of Patent: Aug. 30, 1994

[54] LOW COST SEGMENTED STRUCTURE FOR PRESSURE VESSELS, ROCKET MOTORS, PIPING

[75] Inventors: Frederick W. Van Name, Newark, Del.; Michael A. Gerace, Nottingham, Pa.; Victor Singer, Newark; Brendan M. Walsh, Wilmington, both of Del.

[73] Assignee: Thiokol Corporation, Ogden, Utah

[21] Appl. No.: 847,169

[22] Filed: Mar. 9, 1992

[51] Int. Cl.[5] .............................. F02K 9/00
[52] U.S. Cl. ........................ 60/204; 60/255; 156/172; 220/589
[58] Field of Search .............. 60/255, 253, 204; 102/374; 285/293; 156/172; 220/584, 588, 589, 590

[56] References Cited

U.S. PATENT DOCUMENTS

| | | | |
|---|---|---|---|
| 1,170,036 | 2/1916 | Avery . | |
| 2,464,017 | 3/1949 | Berghorn . | |
| 2,720,332 | 10/1955 | Holt . | |
| 2,921,521 | 1/1960 | La Haye et al. . | |
| 3,228,549 | 1/1966 | Courtney | 220/589 |
| 3,555,816 | 1/1971 | Leasure, Jr. et al. | 60/255 |
| 3,698,320 | 10/1972 | Cochran et al. . | |
| 3,720,167 | 3/1973 | Mainhardt et al. . | |
| 3,889,463 | 6/1975 | San Miguel | 60/255 |
| 4,053,081 | 10/1977 | Minke | 220/589 |
| 4,504,530 | 3/1985 | Bliley | 220/590 |
| 4,589,562 | 5/1986 | Fawley | 220/590 |
| 4,717,035 | 1/1988 | Dirkin et al. | 220/589 |
| 4,767,017 | 8/1988 | Logullo, Sr. et al. | 156/172 |
| 4,911,795 | 3/1990 | Oliff, Jr. | 60/204 |
| 5,032,201 | 7/1991 | Crapiz | 156/172 |
| 5,038,561 | 8/1991 | Chase | 60/255 |
| 5,039,572 | 8/1991 | Bobsein et al. | 156/172 |

*Primary Examiner*—Richard A. Bertsch
*Assistant Examiner*—Michael I. Kocharov
*Attorney, Agent, or Firm*—Ronald L. Lyons; Kendrew H. Colton

[57] ABSTRACT

A composite structure for rocket motors includes a longitudinal element of the composite structure, which is an assembly of segments of clamshell or barrel stave form. The element is held in place by a circumferential element, which is a composite overwrap of reinforcing fibers in a resin matrix. The matrix may be thermoplastic or thermosetting. The reinforcing fiber being high strength polyolefin thereby providing the rocket motor with insensitive munitions capability.

19 Claims, 1 Drawing Sheet

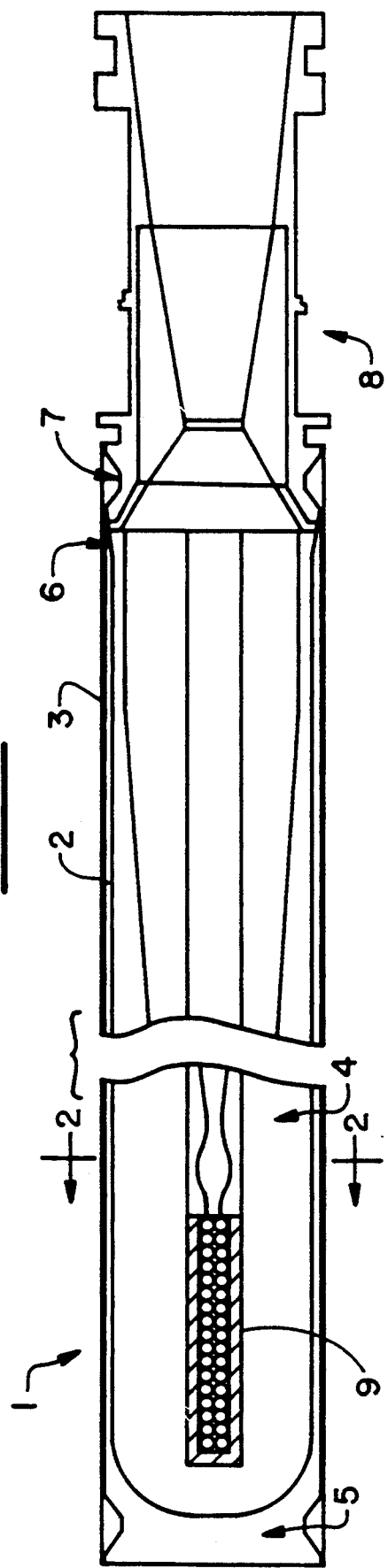
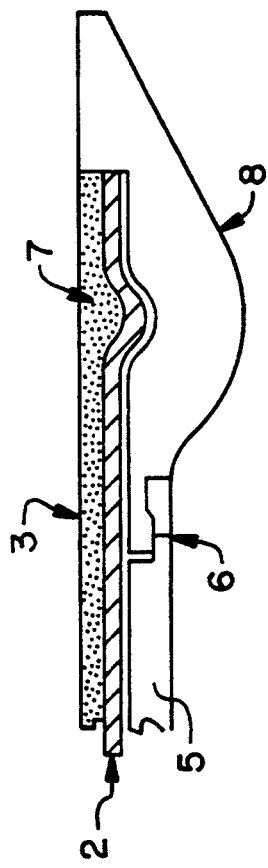
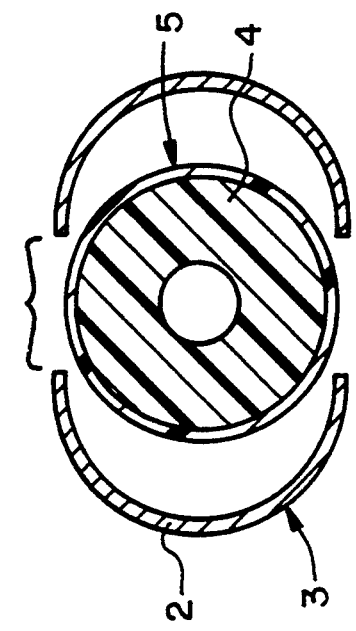

LOW COST SEGMENTED STRUCTURE FOR PRESSURE VESSELS, ROCKET MOTORS, PIPING

BACKGROUND OF THE INVENTION

1. Field of the Invention

This invention relates generally to pressure vessels, rocket motors, and other gas generators, and piping. More particularly, the invention is a composite structure in which longitudinal and circumferential loadings are carried by separate components configured to achieve low cost fabrication and to enable, with particular selections among candidate constituent materials, achievement of vessel behavior characteristics not otherwise readily attainable. The longitudinal component consists of two or more segments resembling clamshells or barrel staves with features at one or both ends that accommodate transfer of longitudinal loads to the forward and/or aft closures. The circumferential or hoop component consists of reinforcing fiber wrapped around the assembled segments, and embedded in a resin matrix. After appropriate cure, the hoop component maintains the proper positions of adjacent longitudinal edges of the segments.

2. Background Information

As is taught in our pending application, U.S. Ser. No. 07/557,920, hereby incorporated by reference, in relation to rocket motors and gas generators, the reinforcing fiber may be selected so that the temperature beyond which it melts, decomposes, or otherwise becomes useless structurally, is below the temperature at which the contained propellant ignites spontaneously.

Although barrels consisting of staves held by a few metal hoops are an ancient design, it cannot be used efficiently in modern vessel designs, including rocket motors and piping, which are used at pressures far in excess of the mere weight of the contents.

SUMMARY OF THE INVENTION

This invention is a composite structure for pressure vessels, piping, rocket motors and the like. The longitudinal element of the composite structure, which is an assembly of segments of clamshell or barrel stave form, is held in place by the circumferential element, which is a composite overwrap of reinforcing fibers in a resin matrix. The matrix may be thermoplastic or thermosetting.

Particularly, this invention is a structure intended to withstand high internal pressure for use as a rocket motor case, pressure vessel, piping or the like, comprising two or more segments abutting at mated edges generally parallel to the length of the structure to form a part of the structure, the segments also having joining means, such as an adhesive bond, welding or, preferably, crimps or crimped edges at one or both ends, and a composite overwrap, wrapped over the segments so as to maintain the mated edges of the segments in their abutted position, e.g., in their aligned adjacent arrangement, said composite comprising reinforcing fiber in a matrix of a resin, the fiber being hoop-wrapped in side-by-side fashion over the surface of the segments so that reinforcing fiber will withstand the intended hoop loading and the segments will withstand the longitudinal loading due to pressure within the vessel, due to the preferred crimps at one or both ends of each segment. These end edges are crimped so as to form a mechanically interlocking feature for transferring longitudinal load to the closure with minimal reliance on an adhesive bonding agent.

The composite overwrap may uniformly cover the entire outer surface of the segments or may be intermittent or locally thickened as can be established by those of ordinary skill to befit the particular embodiment and required pressure capability.

Another embodiment of this invention is a rocket motor comprising a thermoplastic cartridge, filled with a propellant a case having segments and containing the filled cartridge, a composite overwrap covering the segmented case.

The segmented case has two or more segments abutting along mated edges parallel to the length of the case. At least one end of the segmented case should have joining means for joining with a closure with sufficient strength to withstand the intended longitudinal loading on the case, due to pressure. The joining means may be an adhesive bond, a weld or, preferably, crimps or crimped edges, shaped to mate with crimps on the adjoining edge of the closure or nozzle assembly. The composite overwrap comprises a reinforcing fiber in a matrix of resin with the fiber being overwrapped in side-by-side fashion over the surface of the segments so the reinforcing fiber will withstand the intended hoop loading due to pressure on the case, and the fiber composite is overwrapped over the segments so as to maintain the mated edges in an abutting, adjacent position. The thermoplastic should have sufficient elongation to withstand the intended pressure on the case. The thermoplastic is preferably capable of a direct bond to the propellant without use of a liner. The cartridge can be fitted with a closure at either end or nozzle assembly at the aft end. Preferably, the thermoplastic is selected from the group consisting of polyphenylene sulfide, polyetherimide, polyetheretherketone, polyamide-imide and polybutyl terephthalate.

The reinforcing fiber of the composite is selected from a group consisting of graphite, carbon, aramid, high strength polyolefin and fiberglass.

The preferred matrix of the composite is epoxy, more preferably an ultraviolet curable epoxy. By epoxy is meant also the epoxy-novolac resins.

Segments can be either metal or composite. The preferred metals are selected from a group consisting of steel, aluminum, and titanium. The preferred composite of the segments has reinforcing fiber selected from the group consisting of graphite, carbon, aramid, fiberglass and high strength polyolefin.

Preferably, the mated edges are substantially straight, but they could also be curved, or scalloped. The container can be preferably cylindrical or it could also be polygonal. Either or both ends of the segments of the embodiment of this invention can be crimped, to mate to another component such as a nozzle or forward closure in order that the hoop overwrap secures the assembly.

Further, either or both ends of the cartridge can have edges which are formed for a snap fit, e.g., to a component such as a nozzle or closure. This snap fit seals the cartridge to the nozzle or closure so that gases do not escape during ignition.

In another embodiment, this invention is the method of assembling the rocket motor comprising a thermoplastic cartridge, a propellant grain, case segments and a composite overwrap.

The method comprises casting the propellant grain into the cartridge, curing the propellant in the cartridge, and installing the case segments over the cartridge so that the segments are joined along mated edges, overwrapping the case segments with the composite overwrap, and curing the composite overwrap. Again, the composite overwrap comprises reinforcing fiber in a resin matrix and the composite overwrap is overwrapped over the case segments and cured so as to maintain the joint edges in the abutted position and in order to withstand the intended pressure on the segments.

The cartridge can be fitted with a closure or nozzle assembly before the segments are installed.

BRIEF DESCRIPTION OF THE DRAWINGS

FIG. 1 is a schematic cross-sectional side view of a rocket motor having the segment case of this invention.

FIG. 2 is a schematic cross-sectional, partly exploded end view of the rocket motor shown at A—A in FIG. 1.

FIG. 3 is a schematic showing details of the crimp joint 7, snap joint 6 and composite overwrap 3 as they join nozzle assembly 8.

DESCRIPTION OF PREFERRED EMBODIMENTS

The composite structure of this invention, in a preferred embodiment a rocket motor case, is shown in the schematic representation of a rocket motor in FIGS. 1 and 2. Like numbers indicate like elements in both Figures.

The rocket motor 1, is comprised of segmented outer member or segmented rocket case 2, overwrapped with a polyolefin fiber reinforced composite overwrap 3. The segmented case 2 is shown in place in FIG. 1 and in exploded, unmated position in FIG. 2. The case 2 holds cartridge 5 which contains propellant grain 4. Cartridge 5 is a thermoplastic which can also function as an insulator, preferably polyetherimide. See FIGS. 1 and 2 where cartridge 5 extends the length of the propellant grain 4. In this embodiment the case is held at its lateral or end edge by crimp joint 7 to rocket nozzle assembly 8. Thermoplastic cartridge 5 forms the opposite closed end of the rocket motor as shown in FIG. 1, thickened to render it capable of withstanding pressurization. Cartridge 5 is connected and seated to the nozzle assembly 8 by a snap joint 6, as shown. Igniter assembly 9 is also shown in place in FIG. 1. Propellant grain 4 has a typical cylindrical shape with an annular cross-section (hole in the center) for efficient burning when ignited.

A similar embodiment, shown schematically in FIG. 3, illustrates the manner in which the snap joint 6 provides for a gas-tight seal between the cartridge 5 and the nozzle assembly 8. FIG. 3 further illustrates the local increase in the composite overwrap 3 cross-section at the crimp joint 7, which provides the radial restraint necessary to prevent ejection of the nozzle assembly 8 upon operation of the rocket motor.

Rocket Motor Embodiment

A rocket motor similar to the design of FIGS. 1 and 2 was made and passed the fast cook-off test MIL-STD-1512. At 120 seconds the overwrap began to burn and melted away, thereby allowing the segments to detach from the propellant grain. The grain then ignited, burned harmlessly and non-propulsively, which constituted a successful test. The rocket motor consisted of a log of conventional propellant (below) machined and inhibited with an elastomeric coating over which crimped segments of 17-4 PH high strength steel were installed and overwrapped with a high strength polyolefin fiber reinforcement impregnated with an epoxy resin compounded with a curing or gelling agent susceptible to UV initiation. The resin was formulated to enable handling of the motor within minutes, with full cure attained in 4 days at room temperature. Both the forward and aft closures had circumferential grooves to accommodate the crimped segments.

| Component | Materials of Construction Material |
|---|---|
| Reinforcing fiber, in composite | High strength polyolefin Spectra ® 1,000 (Allied-Signal) |
| Matrix Resin, in composite | Epoxy-Loctite 180 (Loctite Corp.) |
| Curing agent, (ultraviolet curable) | Loctite 181 (Loctite Corp.) |
| Thermoplastic for cartridge | Ultem (polyetherimide) (General Electric) |
| Case metal | High strength steel (17-4 PH) |
| Propellant Grain | Ammonium Percholorate-Aluminum with Binder of Hydroxyl Terminated Polybutadiene |

Method of Assembly of Rocket Motor

Following is a detailed method of assembly for the rocket motor described above.

1) A cartridge is injection molded from a thermoplastic such as Ultem. Ultem has been demonstrated as a replacement for liner and insulation in rocket motor cases. This material is sufficiently rigid and provides an excellent bond to the propellant without surface treatment or use of a liner. The cartridge could be configured with an integral forward closure or with a separate closure.

2) The propellant grain is cast into the thermoplastic cartridge and cured.

3) The segments, two clamshell segments or barrel staves for 3 or more segments, are die stamped out of steel sheet stock to the desired contour with crimps at each end. Sheet stock can readily be held to tight tolerances and the die stamping is a much less costly process than extruded or rolled and welded tube.

4) The nozzle/aft closure (steel for short burn time, or ablative plastic for longer burn time) is snap fitted onto the thermoplastic cartridge using a low modulus adhesive such as TI-H-300 on the interfacing surfaces. The adhesive provides low pressure sealing and as pressure increases the sealing surfaces are forced into compression providing the seal. This seal/interface carries no structural load but only the applied deformations due to pressure and thermal loading.

5) The segments, clamshells or barrel staves, are installed over the cartridge assembly.

6) The crimp joints and segments forming a cylinder are hoop overwrapped with polyolefin fiber (Spectra 1000) using an ultraviolet (UV) initiated resin (Loctite 180/181). Compatibility of this fiber and resin has been demonstrated. The hoop overwrap is sufficient to carry the entire hoop load and the metal clamshells carry the axial load. The crimp joints transfer axial load to the segments (clamshell or barrel stave) while the fiber overwrap in the crimp prevents disengagement.

7) The cure is initiated with UV light and the cases can be handled in a few minutes. Full cure is obtained at room temperatures after 4 days unattended. The room temperature cure provides a stress free temperature of the structure near the middle of the operating range.

8) A proof test is performed on each motor or on a statistically significant percentage of the motors.

9) The initiators are installed and the units are packed out for shipment.

Benefits of This Embodiment

This design enables a high performance rocket motor assembly meeting insensitive munitions objectives, with low cost assured thru minimal part count and process time.

Novel features include: a) composite overwrap of a structural crimp joint, b) a snap fit seal and closure alignment feature, c) low cost components and low part count, d) case-on-propellant processing with UV initiated resin, e) an optional component of the casting tooling becomes the winding mandrel and f) IM performance is obtained without sacrificing performance or cost.

The embodiment provides high performance due to the high strength steel (17-4 PH) segments and the high specific strength of the composite overwrap. For insensitive munitions capability the composite overwrap degrades to virtually no strength at 230° F., while providing excellent properties up to 170° F. The snap fit seal assures nozzle alignment prior to overwrapping.

Many options and variations of the above preferred embodiment are compatible with essential features of this invention, including:

1) The case and forward closure could be assembled and conventional lining, insulation, and propellant casting techniques could be used.
2) For still higher performance, where IM is not required, graphite or other fiber could be used.
3) A metal forward closure could be used for attachments to the payload when operational loadings are particularly severe.
4) Since propellants bond well to many thermoplastics, the best choice for the cartridge materials should be based on motor specifications such as burn time, propellant temperature, and mass flow rate. The thermoplastic could be filled with particulate or fibers to tailor the structural and/or thermal properties.
5) Aluminum, titanium or other high strength steels could be used instead of 17-4 PH steel for the clamshells although volumetric loading may decrease.
6) The crimped segments could be of composite rather than metallic construction, produced by molding a laminated assembly of unidirectionally or bidirectionally reinforced prepreg, staged or fully cured in advance of construction of the motor.
7) A low erosion nozzle insert could be used for higher performance.
8) The design is adaptable to other seal features such as O-rings.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. The method of assembling a rocket motor comprising a thermoplastic cartridge, a propellant grain, case segments, and a composite overwrap, said method comprising
   casting said propellant grain into said cartridge
   curing said propellant in said cartridge
   installing said case segments over said cartridge so that said segments are joined along mated edges
   overwrapping said case segments with said composite overwrap, and
   curing said composite overwrap,
   said composite overwrap comprising reinforcing fiber in a resin matrix, said reinforcing fiber being high strength polyolefin, thereby providing insensitive munitions capability to said rocket motor,
   said composite overwrap being overwrapped over said case segments and cured so as to maintain said joined edges in said joined position and so as to withstand the intended pressure on said segments.

2. The method of claim 1 wherein a closure or nozzle assembly is installed at the end of said cartridge before the segments are installed.

3. A composite structure intended to withstand pressure for use as a rocket motor case containing propellant comprising
   two or more segments with adjacent abutting edges generally parallel to the length of said composite structure to form a part of said composite structure and said segments having joining means along at least one end for joining with a closure and
   a composite overwrap, wrapped over said segments so as to maintain said adjacent edges in the abutting position,
   said composite comprising
   reinforcing fiber in
   a matrix of a resin
   said fiber being hoop-wrapped in side-by-side fashion over the surface of said segments so that said reinforcing fiber will withstand the intended hoop loading on said composite structure while said segments will withstand the intended longitudinal loading due to said joining means and said reinforcing fiber being high strength polyolefin thereby providing said rocket motor with insensitive munitions capability by said reinforcing fiber melting below the temperature at which said contained propellant ignites spontaneously.

4. The segments of claim 3 wherein said mated edges are substantially straight.

5. The segments of claim 3 wherein said member is cylindrical.

6. The structure of claim 3 wherein said joining means is a means for crimping said end to fit crimps in a closure.

7. A rocket motor comprising
   a thermoplastic cartridge, filled with
   a propellant,
   a segmented case containing said filled cartridge,
   a composite overwrap covering said segmented case,
   said segmented case having two or more segments abutting along mated edges parallel to the length of said case, at least one end of said segmented case having joining means for joining with a closure with strength sufficient to withstand the intended longitudinal loading on said case, said composite overwrap being wrapped over said segments so as to maintain said mated edges in said abutting position, said composite overwrap comprising reinforcing fiber in a matrix of a resin, said fiber being hoop-wrapped in side-by-side fashion over the surface of said segments so as to maintain said mated edges in the abutting position, and so that said reinforcing fiber will withstand the intended hoop loading on said case, and said reinforcing fiber being high strength polyolefin, thereby providing said rocket motor with insensitive munitions capability, by said reinforcing fiber melting below the temperature at which said contained propellant ignites spontaneously, said thermoplastic having sufficient elongation to withstand the intended pressure on said case.

8. The rocket motor of claim 7 wherein said cartridge is fitted with a closure at either end or nozzle assembly at the aft end.

9. The rocket motor of claim 7 wherein said thermoplastic is selected from the group consisting of polyphenylene sulfide, polyetherimide, polyetheretherketone, polyamide-imide and polybutyl terephthalate.

10. The rocket motor of claim 7 wherein said fiber is selected from the group consisting of graphite, carbon, aramid, high strength polyolefin and fiberglass.

11. The rocket motor of claim 7 wherein said matrix is thermosetting.

12. The rocket motor of claim 7 wherein said matrix is thermoplastic.

13. The rocket motor of claim 7 wherein said matrix is an epoxy.

14. The rocket motor of claim 12 wherein said epoxy is ultraviolet curable.

15. The rocket motor of claim 7 wherein the segments are metal.

16. The rocket motor of claim 10 wherein the metal is selected from the group consisting of steel, aluminum and titanium.

17. The rocket motor of claim 2 wherein the segments are a composite of reinforcing fiber in a matrix.

18. The rocket motor of claim 7 wherein said cartridge has at least one end portion with edges which are formed for a snap fit.

19. The structure of claim 2 wherein said joining means is a means for crimping said end to fit crimps in a closure.

* * * * *